Dec. 2, 1958    D. B. ROBINSON ET AL    2,863,009
JUNCTION MEANS FOR SECTIONAL DUCT
Filed June 7, 1954    3 Sheets-Sheet 3

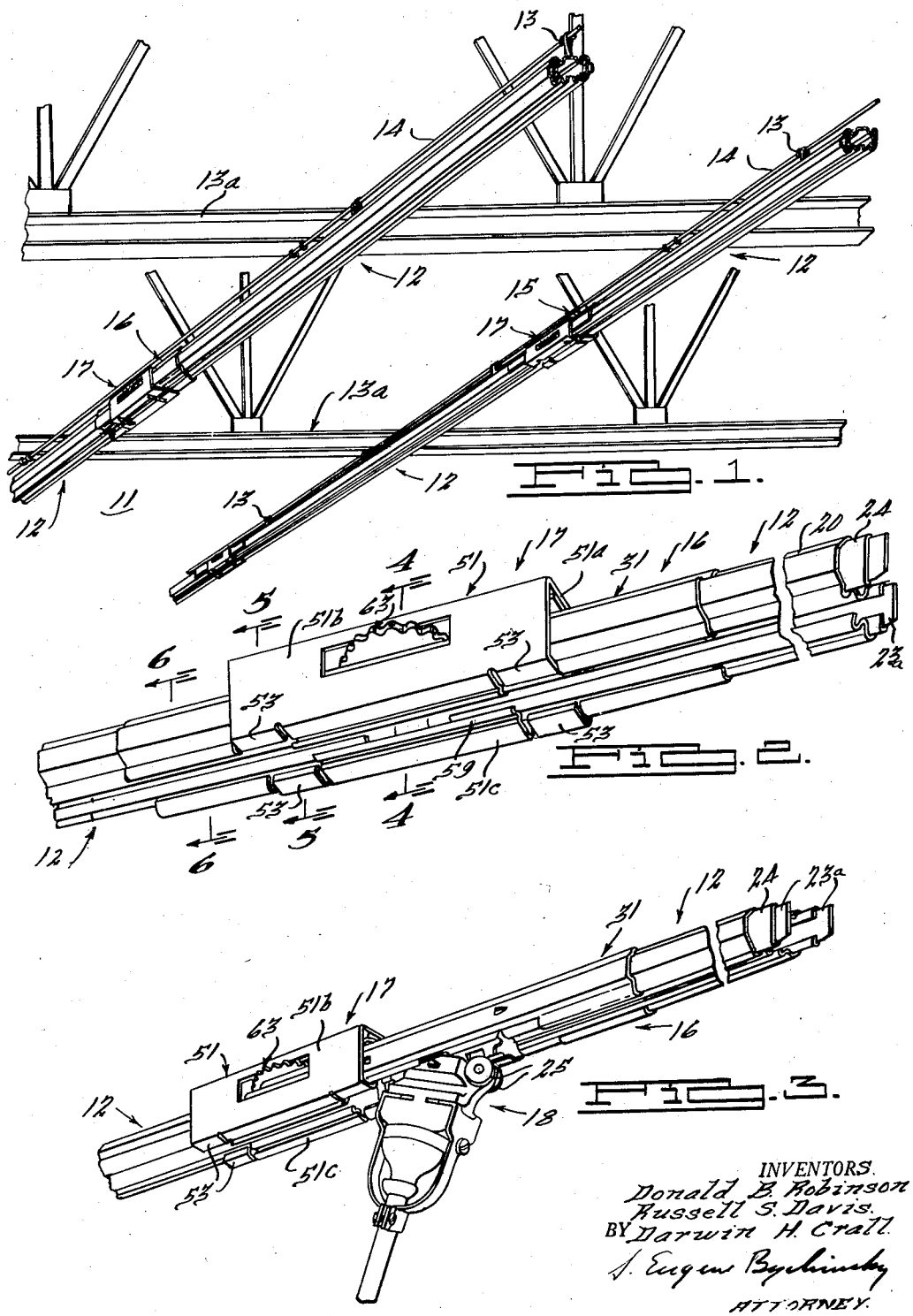

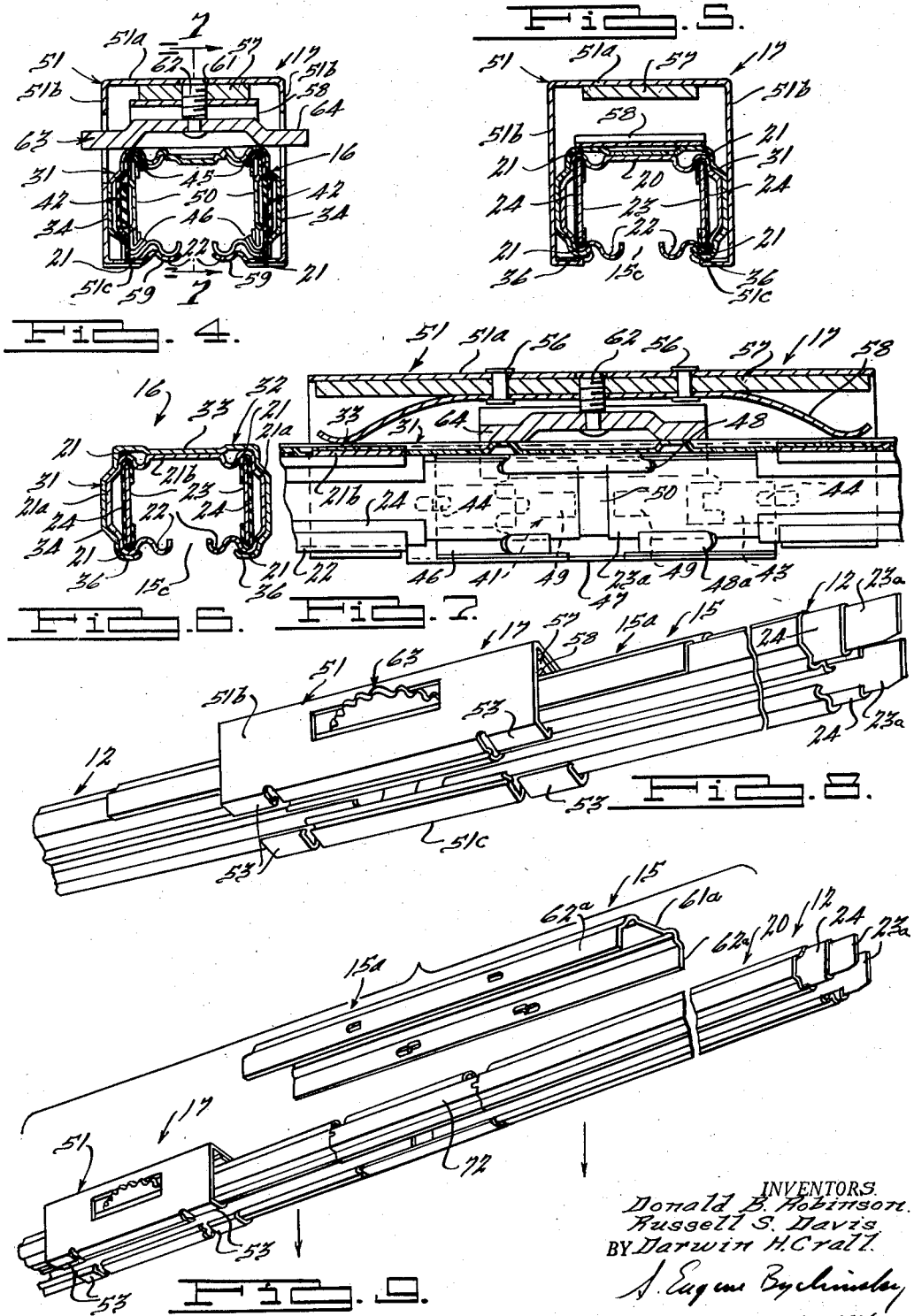

INVENTORS
Donald B. Robinson
Russell S. Davis
BY Darwin H. Crall
J. Eugene Bychinsky
ATTORNEY United States Patent Office 2,863,009
Patented Dec. 2, 1958

1

2,863,009
JUNCTION MEANS FOR SECTIONAL DUCT

Donald B. Robinson, Russell S. Davis, and Darwin H. Crall, Detroit, Mich., assignors, by mesne assignments, to I-T-E Circuit Breaker Company, Philadelphia, Pa., a corporation of Pennsylvania Application June 7, 1954, Serial No. 434,872

5 Claims. (Cl. 191—23)

This invention relates generally to electrical distribution systems of the trolley collector and duct type and particularly to a novel combination junction for the duct used in such systems. The duct to which the invention pertains is similar to that disclosed in Patent 2,086,795, issued July 13, 1937, to W. H. Frank. Patent 2,158,656, which issued May 16, 1939, discloses a method of manufacture for the duct.

The duct of the type disclosed is manufactured and sold in standard sections which are joined together to form a flexible distribution system which employs a trolley type electrical collector for tapping the electrical power distributed by the system. Such collectors are inserted into the duct and are movable therealong to permit electrical tools, receiving current through the collector, to operate at any point along the duct. Such duct systems are required to be sufficiently rigid to support considerable weight and still be easily disassembled to permit examination and replacement of duct sections. It is also important that entrance means, known in the art as a "dropout," be provided to make it possible to easily and conveniently insert and remove the collectors from the duct without impairing either the electrical or mechanical efficiency of the duct. The invention herein disclosed provides interchangeable coupling and dropout duct sections which are secured in place to maintain the rigidity and continuity of the duct. The novel securing means permits the duct to be easily assembled and disassembled when used with the coupling sections and permits ease of assembly and disassembly as well as convenient insertion and removal of the collector when used with the dropout section.

Accordingly, a principal object of the invention is to provide a novel coupling for a duct type electrical distribution system.

Another object is to provide a novel coupling and dropout for a duct type electrical distribution system which permits insertion and removal of a trolley collector.

Another object is to provide a coupling which permits easy removal and replacement of duct sections.

Another object is to provide a coupling which permits removal and replacement of duct sections without requiring disassembly of an entire duct run.

Another object is to provide a coupling for a duct system which strengthens and stabilizes the duct section junctions to assure a rigid duct system.

Another object is to provide a coupling for a duct system which maintains a high degree of electrical conductivity between the conductors of the duct system.

Still another object is to provide a coupling in a duct system which permits trolley collectors to move easily and efficiently from one duct section to another.

Other objects and features of the invention will be apparent to one skilled in the art from the following specification and drawings in which:

Fig. 1 is a perspective view of an electrical distribution system, containing an embodiment of the invention, secured in a building structure.

Fig. 2 is a perspective view of a duct section junction showing an embodiment of the dropout coupling.

Fig. 3 is a perspective view of a duct section junction showing an embodiment of the dropout coupling with a trolley collector partly inserted.

2

Fig. 4 is a cross-sectional view as if on line 4—4 of Fig. 2.

Fig. 5 is a cross-sectional view as if on line 5—5 of Fig. 2.

Fig. 6 is a cross-sectional view as if on line 6—6 of Fig. 2.

Fig. 7 is a cross-sectional view as if on line 7—7 of Fig. 4.

Fig. 8 is a perspective view of a duct section junction showing a union coupling in place.

Fig. 9 is a perspective view of a duct section junction showing the union coupling partially disassembled.

Figure 10:
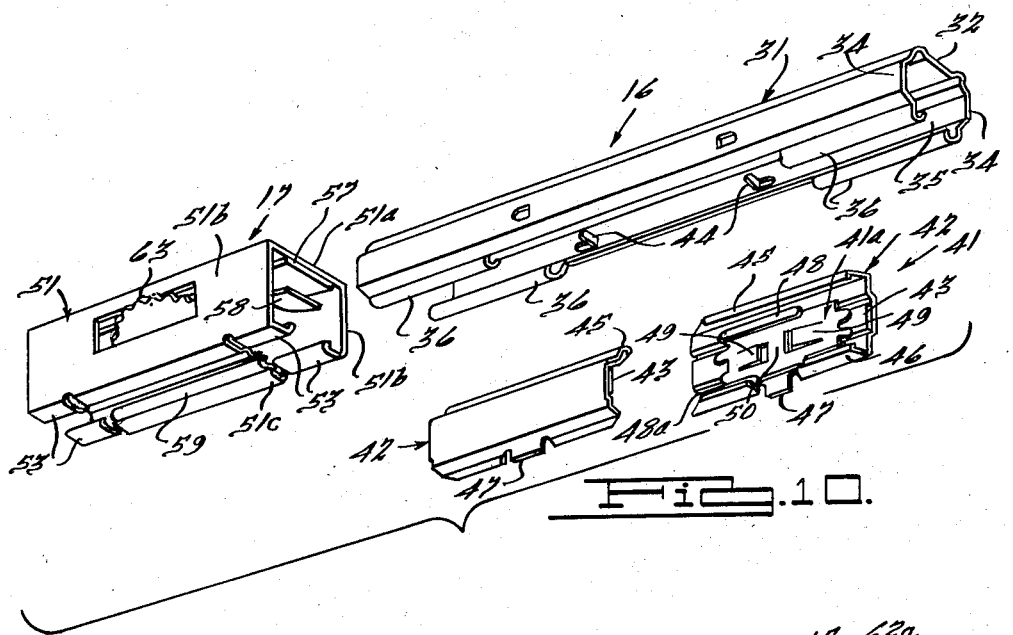

Fig. 10 is a perspective view of the dropout coupling disassembled, showing some of the parts in detail.

Figure 11:
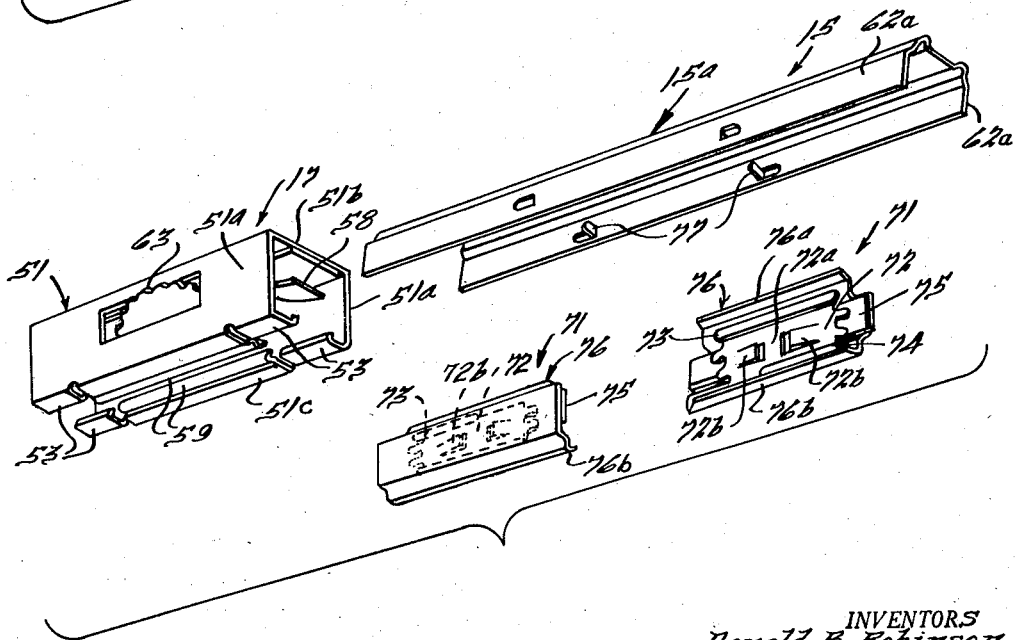

Fig. 11 is a perspective view of the union coupling disassembled, showing some of the parts in detail.

Referring to the drawings Fig. 1 shows an electrical distribution system 11 consisting of standard lengths or sections of duct 12 joined together. The system is shown suspended from the overhead truss structure of a building by suitable steel hangers 13 secured over a steel cable 14 suspended from the lower truss member 13a of the truss structure.

For joining the sections together to form a run of duct, a union coupling (indicated generally as 15) is provided to accomplish a junction. To enable installation and removal of a trolley collector 18 (Fig. 3), a dropout coupling (indicated generally as 16) is disclosed. For securing these sections in place and to form a rigid, stable, efficient junction to accommodate the trolley collector, a slidable locking member 17 is disclosed. These couplings and the novel locking member disclosed as embodiments of the invention will be hereinafter described in detail.

The particular duct shown is a modified form of that disclosed in Patent 2,086,795, referred to hereinabove. As shown in Figs. 4, 5, and 6, each section of duct 12 comprises a sheet metal housing 20 having a narrow centralized slot 15c. Two sets of beads 21 are formed adjacent to the side walls 21a on each side to secure a pair of bus bars 23, each of which is partially surrounded by an insulator sheet 24. The bus bars 23 have portions 23a extending beyond the end of the duct housing 20 to permit electrical connection between the duct sections 12. A pair of beads 22 is formed adjacent to slot 15 to provide tracks for the wheels 25 of a trolley collector 18 (Figs. 3 and 4).

When it is desired to join two duct sections end to end and also permit insertion and removal of the trolley collector 18, the dropout coupling 16 (Figs. 2 and 3) is utilized. This dropout coupling 16 is shown in detail in Fig. 10 and comprises a housing 31 of sheet metal formed in a U shape approximately 10 inches in length having a top wall 32 (Fig. 6) with a central depressed portion 33, side walls 34 fabricated as shown and a slot 35. Adjacent to slot 35 on each side there is formed a bead 36 which is cut away in the central portion of the coupling (Fig. 10) to provide a gateway to permit insertion and removal of the trolley collector 18. A connector 41 (Fig. 10) comprises a contactor 41a, an anchor plate 43, and an insulating shield 42. Contactor 41a is formed of copper or other conductive material and is secured by inwardly bent ears (not shown) to anchor plate 43. Anchor plate 43 in turn is slidably disposed in a formed channel recess of insulating shield 42. Shield 42, which insulates contactor 41a from housing 31, is shaped (as shown in Fig. 10) with a downwardly turned lip 45 extending from the upper portion and an upwardly turned lip 46 having a tongue 47 formed and bent back upon itself to extend below the side wall 34 of the coupling housing 31 to prevent contact between the trolley collector and the coupling housing 31 when trolley collector 18 is being inserted or removed from the coupling 16. A connector 41 is secured to each of side walls 34 of housing 31 by two lugs 44 which are bent inwardly over the ends of anchor plate 43. Contactor 41a has a downwardly turned lip 48 on its upper portion and an upwardly turned lip 48a with the central portion cut away, as shown. A pair of inwardly extending resilient lugs 49 are formed adjacent to a central embossment 50. Upon insertion of a section of duct into coupling 16, the ends 23a of bus bars 23 abut each side of embossment 50 and are held in place to secure good electrical contact by lugs 49 biasing the bus bar inwardly against lips 48 and 48a.

The locking member 17 (Fig. 2), referred to hereinabove, comprises a rectangularly shaped sheet metal housing 51 having a top wall 51a, side walls 51b, and a slotted bottom wall 51c. The central portion of bottom wall 51c is beaded on each side to form tracks 59 to meet with track beads 22 of the duct section 12 to form a continuous track through the coupling. The spaced end portions 53 of lower wall 51c are offset upwardly from the central track portion of wall 51 to guide locking member 17 as it is moved along the duct section 12 by engaging the lower surface of beads 21, as shown in Fig. 5. These end portions 53 also position the locking member 17 by abutting the inner ends of beads 36 of coupling 16.

Secured to the top wall 51a of locking member 17 by rivets 56 is a support bar 57 and a leaf spring 58 (Fig. 7). The end portions of leaf spring 58, when positioned on the coupling 16, abut the top wall 51 of coupling 16 to bias locking member 17 upwardly. A tapped hole 61 (Fig. 4) is provided in spring 58, support bar 57, and top wall 51a of locking member 17. Inserted into tapped hole 61 is a screw threaded member 62 having a metal lock 63 integrally secured thereto. The peripheral portion 64 of lock 63 is offset from the inner portion, as shown in Fig. 4, to contact the upper surface of top wall 32 of coupling 16 when rotated clockwise to cause it to move downwardly. The perimeter of the peripheral portion 64 is notched, as shown, to permit easy manual rotation.

To form a dropout junction between adjacent duct sections 12, the lock 63 of locking member 17 is rotated into its uppermost position, and locking member 17 is positioned on one section of the duct 12 by inserting the end of the duct section into the space between the lower end of spring 58 and the inner surface of spaced end portions 53 of lower wall 51c. The locking member 17 is then pushed downwardly against the bias of spring 58, which bears on the upper surface of top wall 32 of the duct, to permit the spaced end portions 53 to clear the beads 21 of the duct section. The locking member 17 then is slid along the duct section a short distance. The coupling 16 is then positioned between adjacent duct section ends, and the ends are pushed into the coupling. The projecting ends 23a of bus bars 23 are received between lips 48 and 48a of contactor 41a and in abutment with the edges of embossment 50. Spring lugs 49 press inwardly on the projecting ends 23a to form an efficient mechanical and electrical connection between lips 48 and 48a and spring lugs 49. The beads 21 of the duct section 12 rest in and are enclosed by the side walls 34, top wall 32, and the beads 36 of coupling 16. When the duct sections 12 are fully inserted, a lug (not shown) in the top wall of coupling 16 engages a notch (not shown) in the top wall 21b of each duct section 12 to securely lock the members together. The locking member 17 is then again depressed against the bias of spring 58 and moved along the duct section 12 and over coupling 16 until tracks 59 are opposite the space between the ends of the duct housing 20. The locking member 17 then moves upwardly under the bias of spring 58 until tracks 59 are flush with track beads 22 of duct section 12. A continuous uninterrupted track is thereby formed through the junction. Lock 63 is then manually rotated clockwise to engage the top wall 32 of the coupling 16 to secure the locking member 17 and coupling 16 together.

If it is desired to insert or remove a trolley collector 18, the lock 64 is loosened and the locking member 17 is slid away from the coupling 16 in reverse manner to that above described. The collector is then inserted or removed through the opening in housing 31 of coupling 16 as permitted by the cut away portion of lip 46 of shield 42 and lip 48a of contactor 41a of connector 41. Locking member 17 is then repositioned on the coupling 16.

Between certain duct sections it may be desirable to have an easily removable coupling without the dropout feature. For this purpose an embodiment of a union coupling 15 is disclosed. The coupling 15 (Figs. 8, 9, and 11) includes a housing 15a having a top wall 61a, similar to that of coupling 16. Side walls 62a are foreshortened to partially enclose a duct section 12. When housing 15a is positioned on the duct, side walls 62a extend down as far as the point where side walls 21a of duct housing 20 curve inwardly to form beads 21 (Fig. 8). The housing 15a can thus be removed from the top of the junction. A connector 71 is provided, similar to connector 41 described above, comprising a contactor 72, an insulating shield 76, and an anchor plate 75. An upper lip 73 is formed by turning down the upper portion of contactor 72, and a lower lip 74 is formed by turning up a segment of the lower portion of contactor 72. Connector 71 is secured to anchor plate 75, which in turn is slidably disposed in insulating shield 76 having an upper lip 76a and a lower lip 76b. The connector 71 and shield 76 are secured on the side walls of housing 15a by lugs 77 which are bent inwardly over the ends of anchor plate 75 when the connector 71 is assembled into the housing 15a. This connector is easily dismounted from the housing 15a by sliding it downwardly, as shown in Fig. 11, from engagement with lugs 77 as permitted by the cut away on each end of the upper lip 76a of shield 76.

The union coupling 15 and locking member 17 are assembled between duct sections to provide a junction for a continuous duct run by inserting the ends of adjacent duct sections into the coupling 15 in the same manner as that described above for the dropout coupling. Disassembly of the junction is accomplished conveniently by disengaging hangers 13 from cable 14 on both sides of the junction and moving locking member 17 to an adjacent duct section 12. Duct sections 12 joined by the coupling are moved downwardly in the direction of the arrows (Fig. 9). The coupling housing 15a will separate from the duct housing 20 and can then be grasped and pulled upwardly from the duct junction. Such operation is permitted by the cut away on the left side of lower lip 74 of contactor 72, which provides clearance for the extending bus bar ends 23a as the duct section 12 on the left is moved downwardly. The connector, comprising the contactor 72, insulating shield 76, and anchor plate 75, is left in position, joining the bus bar ends 23a of the duct sections 12. The latter are then pulled apart, and the connector removed from the bus bar ends 23a.

From the foregoing description it can be seen that a novel, simple, efficient junction for duct sections is disclosed.

For determination of the scope of the invention disclosed herein, reference should be had to the following claims.

We claim:
1. A junction means in combination with a sectional duct type electrical distribution system having bus bar conductors for distributing electrical current to a trolley collector movable along said duct; said junction means being operatively positioned between and concentric with adjacent sections of said duct system; said junction means being comprised of a locking member and a coupling means; said coupling means being operatively positioned on the exterior and concentric with sections of said duct system; said locking member being operatively positioned on the exterior and concentric with respect to said coupling means; said coupling means containing a terminal connection on the interior thereof for electrical joining bus bars of one duct section to another; said locking member containing a resilient member and a manually operable lock positioned on the interior thereof; said resilient member being operatively positioned between said manually operable lock and said locking member; said manually operable lock being operatively positioned with respect to an opening in said locking member to permit access thereof from the exterior of said locking member to thereby permit said manually operable lock to secure said locking member to said coupling means through said resilient member.

2. A juntion means in combination with a sectional duct type electrical distribution system having bus bar conductors for distributing electrical current to a trolley collector movable along said duct; said junction means being operatively positioned between and concentric with adjacent sections of said duct system; said junction means being comprised of a locking member and a coupling means; said coupling means being operatively positioned on the exterior and concentric with sections of said duct system; said locking member being operatively positioned on the exterior and concentric with respect to said coupling means; said coupling means containing a terminal connection on the interior thereof for electrical joining bus bars of one duct section to another; said locking member containing a resilient member and a manually operable lock positioned on the interior thereof; said resilient member being operatively positioned between said manually operable lock and said locking member; said manually operable lock being operatively positioned with respect to an opening in said locking member to permit access thereof from the exterior of said locking member to thereby permit said manually operable lock to secure said locking member to said coupling means through said resilient member; said locking member including a track portion operatively positioned in alignment with a track portion of said coupling means to thereby permit said trolley collector to pass unimpeded from one duct section through its adjacent duct section when said locking member is secured to said coupling means.

3. A junction means in combination with a sectional duct type electrical distribution system having bus bar conductors for distributing electrical current to a trolley collector movable along said duct; said junction means being operatively positioned between and concentric with adjacent sections of said duct system; said junction means being comprised of a locking member and a coupling means; said coupling means being operatively positioned on the exterior and concentric with sections of said duct system; said locking member being operatively positioned on the exterior and concentric with respect to said coupling means; said coupling means containing a terminal connection on the interior thereof for electrical joining bus bars of one duct section to another; said locking member containing a resilient member and a manually operable lock positioned on the interior thereof; said resilient member being operatively positioned between said manually operable lock and said locking member; said manually operable lock being operatively positioned with respect to an opening in said locking member to permit access thereof from the exterior of said locking member to thereby permit said manually operable lock to secure said locking member to said coupling means through said resilient member; said terminal connection comprising an insulating shield, an anchor plate disposed in said shield and supported thereby.

4. A junction means in combination with a sectional duct type electrical distribution system having bus bar conductors for distributing electrical current to a trolley collector movable along said duct; said junction means being operatively positioned between and concentric with adjacent sections of said duct system; said junction means being comprised of a locking member and a coupling means; said coupling means being operatively positioned on the exterior and concentric with sections of said duct system; said locking member being operatively positioned on the exterior and concentric with respect to said coupling means; said coupling means containing a terminal connection on the interior thereof for electrical joining bus bars of one duct section to another; said locking member containing a resilient member and a manually operable lock positioned on the interior thereof; said resilient member being operatively positioned between said manually operable lock and said locking member; said manually operable lock being operatively positioned with respect to an opening in said locking member to permit access thereof from the exterior of said locking member to thereby permit said manually operable lock to secure said locking member to said coupling means through said resilient member; said locking member including a track portion operatively positioned in alignment with a track portion of said coupling means to thereby to permit said trolley collector pass unimpeded from one duct section through its adjacent duct section when said locking member is secured to said coupling means; said terminal connection comprising an insulating shield, an anchor plate disposed in said shield and supported thereby.

5. A junction means in combination with a sectional duct type electrical distribution system having bus bar conductors for distributing electrical current to a trolley collector movable along said duct; said junction means being operatively positioned between and concentric with adjacent sections of said duct system; said junction means being comprised of a locking member and a coupling means; said coupling means being operatively positioned on the exterior and concentric with sections of said duct system; said locking member being operatively positioned on the exterior and concentric with respect to said coupling means; said coupling means containing a terminal connection on the interior thereof for electrical joining bus bars of one duct section to another; said locking member containing a resilient member and a manually operable lock positioned on the interior thereof; said resilient member being operatively positioned between said manually operable lock and said locking member; said manually operable lock being operatively positioned with respect to an opening in said locking member to permit access thereof from the exterior of said locking member to thereby permit said manually operable lock to secure said locking member to said coupling means through said resilient member; said locking member including a track portion operatively positioned in alignment with a track portion of said coupling means to thereby permit said trolley collector to pass unimpeded from one duct section through its adjacent duct section when said locking member is secured to said coupling means; said terminal connection having an upper-lip and lower-lip; said lower-lip having spaced from one end of said terminal connection to permit the ends of the bus bars of one duct section to move downwardly when said duct sections are rotated downwardly for disassembly to thereby facilitate removal of said coupling means and disassembly of said coupling means to separate the adjacent sections of said duct.

References Cited in the file of this patent

UNITED STATES PATENTS

| | | |
|---|---|---|
| 2,086,795 | Frank | July 13, 1937 |
| 2,096,313 | Anderson | Oct. 19, 1937 |
| 2,117,480 | Harvey | May 17, 1938 |
| 2,128,135 | Glasgow | Aug. 23, 1938 |
| 2,128,998 | Frank et al. | Sept. 6, 1938 |
| 2,148,237 | Kingdon | Feb. 21, 1939 |
| 2,412,382 | Anderson et al. | Dec. 10, 1946 |